US006823679B2

United States Patent
Lozano et al.

(10) Patent No.: US 6,823,679 B2
(45) Date of Patent: Nov. 30, 2004

(54) ANTI-ICING FLUID INJECTION NOZZLE

(75) Inventors: Martin E. Lozano, Whittier, CA (US); Christopher A. Moore, Long Beach, CA (US); David A. Neary, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 10/352,341

(22) Filed: Jan. 27, 2003

(65) Prior Publication Data

US 2004/0144102 A1 Jul. 29, 2004

(51) Int. Cl.[7] .................................................. F17C 7/02
(52) U.S. Cl. ........................................ 62/52.1; 62/46.1
(58) Field of Search ................................ 62/47.1, 46.1, 62/52.1, 373

(56) References Cited

U.S. PATENT DOCUMENTS

| | | | | |
|---|---|---|---|---|
| 5,475,984 A | * | 12/1995 | Fermani et al. | 62/64 |
| 5,644,920 A | * | 7/1997 | Lak et al. | 62/47.1 |
| 5,806,318 A | * | 9/1998 | DiIorio et al. | 62/46.1 |
| 5,964,094 A | * | 10/1999 | Butler et al. | 62/46.1 |
| 6,073,450 A | | 6/2000 | Lak et al. | |
| 6,116,030 A | * | 9/2000 | Story | 62/7 |
| 6,131,395 A | * | 10/2000 | Greene et al. | 62/7 |
| 6,151,900 A | * | 11/2000 | Lak et al. | 62/46.1 |
| 6,324,852 B1 | * | 12/2001 | Cheng | 62/52.1 |

OTHER PUBLICATIONS

T. I. Lak, Technical Fellow, AIAA 2002–3599 Propellant Densification Without Use Of Rotating Machinery, 38th AIAA/ASME/SAE/ASEE Joint Propulsion Conference & Exhibit Indianapolis, Indiana, July 7–10, 2002, pp. 1–10.

* cited by examiner

*Primary Examiner*—William C. Doerrler
(74) *Attorney, Agent, or Firm*—Harness Dickey & Pierce P.L.C.

(57) ABSTRACT

A system to produce a densified fluid, and more particularly a densified propellant to be used in a launch vehicle. The system includes a vessel containing a first fluid and an injection nozzle to inject a cooling fluid into the vessel. The first fluid in the vessel has a freezing temperature greater than the boiling point of the second fluid that is injected into it. The second fluid is injected into the first fluid and evaporates therefrom to cool the first fluid. An anti-icing chamber is placed around the injection nozzle and a third fluid is provided to the anti-icing chamber to form an interface which does not allow the first fluid to contact the injection nozzle. In this way, the second fluid can be substantially continuously provided through the injection nozzle to the first fluid to cool the first fluid. A heat exchanger can then be provided in the vessel to cool an additional material.

23 Claims, 1 Drawing Sheet

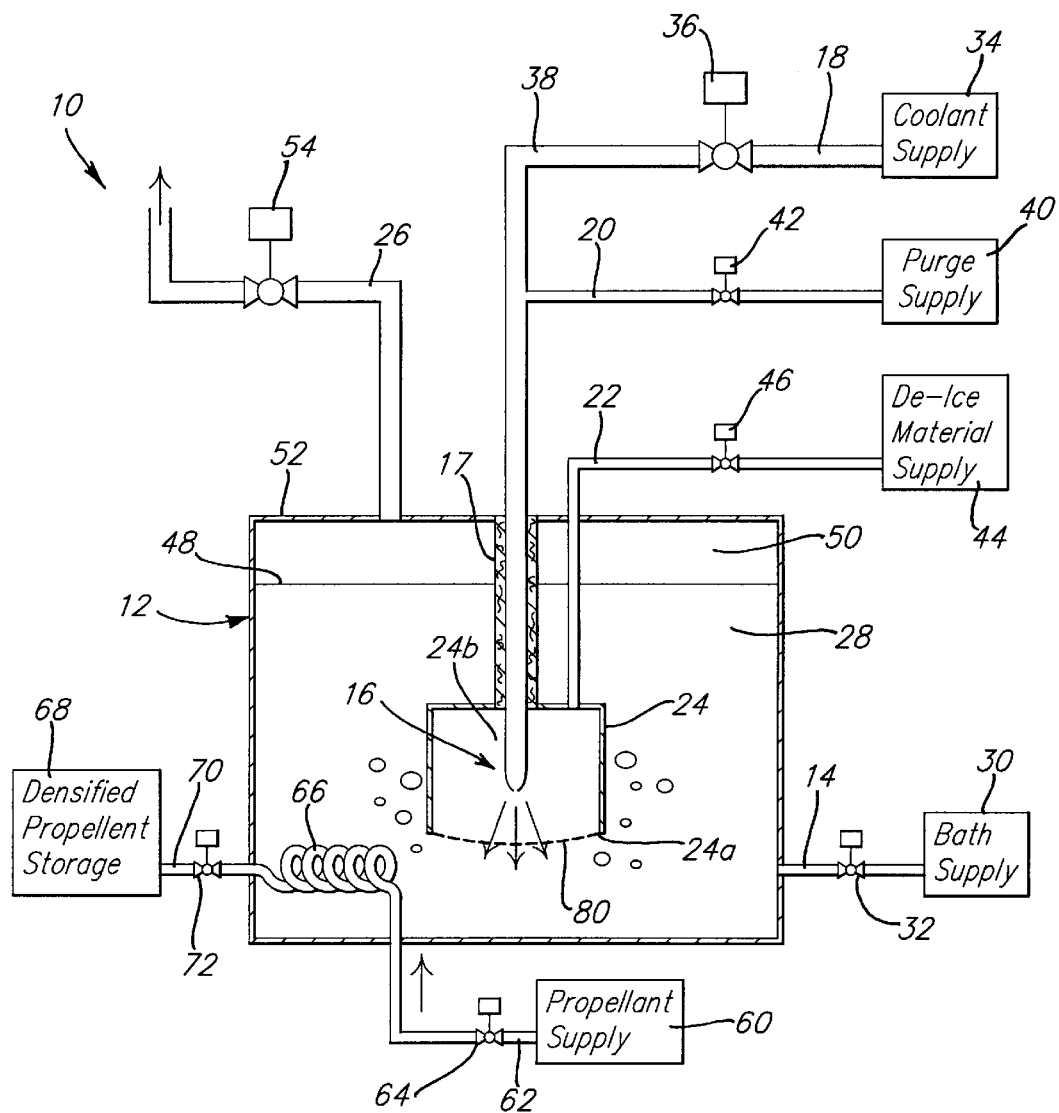

ANTI-ICING FLUID INJECTION NOZZLE

FIELD OF THE INVENTION

The present invention relates to densification of materials, and particularly relates to de-icing or anti-icing injection nozzles used for injecting a material into a fluid bath in a densification system.

BACKGROUND OF THE INVENTION

Launch vehicles for transporting a payload into space from the Earth generally include storage tanks to store propellant for use during the launch operation. When developing and launching a launch vehicle, a balance must be struck between the amount of propellant that is included in the storage tanks and the amount of payload that can be moved by the launch vehicle. Generally, it requires more propellant to move a heavy payload, in turn requiring larger and heavier propellant tanks. Nevertheless, it is the per unit power production that is most important; a denser fuel generally provides more energy per unit volume than a less dense fuel. Moreover, if a fuel with a higher per unit energy production can be used, a greater payload can be provided for the same volume of fuel provided in the launch vehicle.

Therefore, densifying the propellants for launch vehicle use can reduce the volume of propellant needed to launch a given sized payload. Specifically, propellants can be subcooled below the normal boiling point temperature to increase the density of the propellant so that less propellant is needed to provide the same thrust or propulsive impulse to the launch vehicle. This can substantially reduce the amount of propellant needed to move a given payload. Alternatively, a larger payload can be provided when the same volume of densified propellant is substituted for a given volume of undensified propellant. Moreover, the gross liftoff weight of the vehicle can be reduced due to the lower vapor pressure of the densified propellant which results in lower tank operating pressures and reduced mass of the storage tanks.

One system for densifying a fluid is described in U.S. Pat. No. 5,644,920, entitled "Liquid Propellant Densification", incorporated herein by reference. This system can densify a propellant by directly injecting a lower boiling point fluid into a higher boiling point liquid bath to subcool the bath material below its normal boiling point temperature. A propellant can then be passed through the subcooled bath material in a heat exchanger to cool or densify the propellant during loading operations.

Other densification systems have also been developed which use turbo pumps and other complex machinery to densify the propellant. However, these systems are extremely costly and complex to operate compared to the liquid injection densification system. As a result, they greatly increase the cost of the propellant that can be provided to a launch vehicle even though the material is densified.

Densified propellants also have a greater heat capacity than undensified propellants, and therefore the vapor pressure of the propellant in the vehicle storage tanks are lower after loading operations. This results in increased propellant mass after loading and increases the payload capacity of the launch vehicle.

Therefore, it is desired to provide a system that can densify a propellant for a launch vehicle in an efficient and inexpensive manner. One drawback of the densification system described above is the propensity of the system to freeze at the injection sites, thereby reducing efficiency and requiring unplanned thaw-cycles. Therefore, it is desired to provide a densification system that can continuously densify a propellant to be provided to a launch vehicle using the liquid injection process without requiring unplanned cycling to de-ice an injection nozzle. Such a system should be able to efficiently and inexpensively densify a propellant to be used in a launch vehicle to increase the payload or decrease the amount of the weight of the vehicle dedicated to propellant storage.

SUMMARY OF THE INVENTION

The present invention is directed to a system to produce a densified propellant to be used in a launch vehicle. The system includes a bath container or vessel and an injection nozzle to inject a cooling material into the bath container. Contained within the bath container is a fluid that has a freezing temperature greater than the boiling point temperature of the cooling material injected into the bath fluid. As the cooling material is injected below the surface of the bath material, it evaporates and subcools the bath material below its normal boiling point. Surrounding the injection nozzle is an anti-icing chamber that is filled with a non-condensable gas. This non-condensable gas surrounds the injection nozzle and provides an area that is substantially free of the bath material. The cooling material injected into the bath from the injection nozzle is not injected directly into the bath material, but rather flows through the anti-icing chamber. This substantially eliminates the possibility of ice build-up on the injection nozzle as the fluid is injected from the injection nozzle into the bath material.

A first preferred embodiment of the present invention includes a cooling system to cool a first fluid with a second fluid. The system includes a vessel containing a selected volume of the first fluid. A cooling injection nozzle disposed in the vessel injects the second fluid, which is held in a coolant container, into the first fluid. A supply line interconnects the coolant container and the cooling injection nozzle. A chamber is disposed in the vessel and surrounds at least a portion of the injection nozzle. The chamber defines an opening, but substantially eliminates an influx of the first fluid towards the injection nozzle from a plurality of sides. A purge gas inlet extends from the chamber to supply a volume of a purge gas from a purge gas supply to the chamber. An interface is formed between the first fluid and the purge gas when the purge gas is supplied to the chamber. The chamber allows for a substantially maintainable and selectable temperature of the first fluid.

A second preferred embodiment of the present invention includes an anti-crystallization apparatus to substantially eliminate the formation of crystals on or in an injection nozzle. The anti-crystallization apparatus includes a chamber that defines an anti-crystallization volume and has an outlet opening. A first injection port allows a first fluid to be injected at a selected rate through the chamber and through the outlet opening. A second injection port injects a noncondensible gas into the chamber to maintain a pressure within the chamber greater than a pressure outside of the chamber. An interface is formed at the outlet opening between the non-condensible gas and an exterior fluid present adjacent an exterior of the chamber such that the exterior fluid is substantially eliminated from the interior of the chamber.

A third preferred embodiment of the present invention provides a method of densifying a material by injecting a first fluid, using an injection nozzle, into a second fluid through an anti-icing chamber. A vessel is first filled with a selected volume of the second fluid. The anti-icing chamber is placed in the vessel substantially within the volume of the second fluid. The chamber also includes an outlet opening. An interface is then formed adjacent the outlet opening. The first fluid is then injected into the second fluid through the outlet opening. The interface and the chamber substantially eliminate contact between the second fluid and the injection nozzle.

Further areas of applicability of the present invention will become apparent from the detailed description provided hereinafter. It should be understood that the detailed description, while indicating at least one preferred embodiment of the invention, is intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified diagram of a densifying system including an anti-icing apparatus according to an embodiment of the present invention.

DETAILED DESCRIPTION OF THE PREFERRED EMBODIMENTS

The following description is merely exemplary in nature and is in no way intended to limit the invention, its application, or uses. Although the following description is related to particular fluids, it will be understood that the present invention can be used in conjunction with any suitable combination of materials. In addition, although the following description relates generally to cryogenic densification, it will also be understood that the present invention can be used in non-cryogenic densification.

With reference to FIG. 1, a simplified diagram of a densification system 10 in accordance with a preferred embodiment of the present invention is illustrated. It will be understood that the components shown in FIG. 1 are not to scale. The system 10 includes a bath container or vessel 12, a bath fill line 14, an injection nozzle 16, an injection line 18, a purge line 20, and a anti-icification line 22. The injection nozzle 16 comprises a cooling or densifying injection nozzle. The anti-icification line 22 provides a anti-icification material to an anti-icification shroud or chamber 24. A vent line 26 is also provided to allow material to vent from the bath container 12. The chamber 24 surrounds the injection nozzle 16 and includes an opening 24a that allows for the creation of a gas/liquid interface area 80 (to be described further herein). The solid portion of the chamber 24 may surround any appropriate portion of the nozzle 16, but generally defines at least about 20% of the total area around the nozzle 16. At most, the chamber 24 encloses about 80% of the total area around the nozzle 16. The opening 24a essentially forms an outlet of the chamber 24. An insulation layer 17 is provided on a portion of the combined injection line 38 within the vessel 12. The insulation layer 17 may comprise an epoxy based, cryogenic-compatible insulation, vacuum jacketed insulation, or any other suitable insulating material.

The bath container 12 is filled with a bath material or fluid 28 supplied from a bath supply or reservoir 30. The bath material 28 is supplied from the bath reservoir 30 through the bath supply line 14 that is selectively controlled by a bath control valve 32. A coolant supply or reservoir 34 supplies the coolant material through the injection line 18 and is selectively controlled by a valve 36. After valve 36 the coolant material passes through a combined injection line 38. A purge material from a purge material supply or reservoir 40 is also supplied through the combined injection line 38. The flow of the purge material from the purge reservoir 40 is controlled by a valve 42. In this way, the purge material can be selectively and continuously provided through the injection nozzle 16 regardless of the flow of the injection material from the injection reservoir 34.

An anti-icification material such as a non-condensible purge gas is provided from the anti-icification reservoir 44. The supply of anti-icification material is controlled by a valve 46 so that the anti-icification material can be selectively provided to the anti-icification chamber 24 through the anti-icification line 22. In this way, the quantity of each of the materials provided to the bath chamber 12 can be selectively controlled by the respective valves 32, 36, 42, 46.

The bath material 28 fills the bath container 12 to a selected level 48. This allows for a certain portion of free or evaporation space 50 to be provided between the selected upper level line 48 of bath material 28 and a top wall 52 of the bath container 12. The evaporation space 50 allows the coolant material that is injected in the bath material 28 to evaporate below the bath material surface 48 and collect in the free space 50. From the free space 50, the coolant material may vent through the vent line 26 to the exterior of the bath container 12. The amount of material being vented through the vent line 26 can be controlled by a valve 54.

Once the system 10 is operational, a propellant from a propellant supply 60 is provided through a propellant supply line 62 that is controlled by a valve 64. The propellant is supplied into the bath container 12 through a heat exchanger 66. As the propellant travels through the heat exchanger 66, the propellant is densified because of the thermal contact with the cooler bath material 28. The densified propellant is then provided to a densified propellant storage tank 68 through a densified propellant transport line 70 that is controlled by a valve 72. Therefore, the propellant is efficiently densified by transporting it through the bath liquid 28 and allowing a thermal exchange between the propellant and the bath material 28.

The heat exchanger 66 may come in thermal contact with the coolant material injected through the nozzle 16, therefore additional cooling of the heat exchanger 66 may be provided. The evaporation primarily helps remove thermal energy from the bath material 28 from within the bath container 12. Although the heat exchanger 66 is shown immersed in the bath material 28, it will be understood that the heat exchanger 66 may be positioned anywhere in thermal contact With the bath.

The following is an exemplary description of the operation of the densification system 10 described above and is not meant to limit the application of the present invention. Specifically, although certain materials and fluids are included as examples to be used in the densification system 10, they are not meant to limit the scope of the present invention. Moreover, while the present invention is described in relation to densifying propellants for launch vehicles, it will be understood that the densification system 10 can be used to densify many materials for other purposes.

The method for use of the densification system 10 begins by filling the bath container 12 with the bath material 28 from the bath reservoir 30. The bath material 28 can be any appropriate flowable material, but is generally a fluid and particularly a liquid. The bath material 28 is generally selected to include a material that can be cooled by injecting a second material, also generally a fluid and specifically a liquid, into the bath material 28 and allowing the coolant material to evaporate from the bath material 28 to cool the bath material 28. The boiling point of the bath material 28 is generally above the boiling point of the coolant material from the coolant supply 34. An exemplary bath material is liquid nitrogen ($LN_2$).

Once the bath container 28 is filled to the selected level line 48, the coolant material from the coolant reservoir 34 can be injected through the injection nozzle 16. When the injection nozzle 16 is not being supplied with the coolant material, the purge material from the purge reservoir 40 can be supplied to the injection nozzle 16 prior to or during operation to ensure that the injection nozzle 16 does not become clogged. When liquid nitrogen is the selected bath material 28, the coolant material may be liquid hydrogen ($LH_2$). Liquid hydrogen has a boiling point lower than that of liquid nitrogen. Therefore, when the liquid hydrogen is provided through the injection nozzle 16 into the bath material 28, it can evaporate into the free space 50, thereby cooling the bath material 28.

During the filling of the bath container 12, the purge material from the purge reservoir 40 is provided through the injection nozzle 16. An exemplary purge material is helium. The purge material can also be used as the anti-icification material, so that the purge reservoir 40 and the anti-icification material reservoir 44 can contain the same substances. It will be understood, however, that different materials can be used as the anti-icification material and the purge material.

Once the bath container 12 is filled with the bath material 28 to the selected level line 48, the coolant material is injected through the injection nozzle 16. While the coolant material is injected through the injection nozzle 16, however, the anti-icification material is supplied to the anti-icification chamber 24. The anti-icification material is generally supplied as a gas, particularly a non-condensable gas. Helium is one preferred anti-icification material. The anti-icification material fills the anti-icification chamber 24 and creates a non-condensable gas "shroud" or anti-icing area 24b surrounding the injection nozzle 16. Therefore, the liquid provided from the injection nozzle 16 is injected first into the anti-icing area 24b created within the anti-icification chamber 24 and then into the bath material 28.

The pressure of the anti-icing material creates the gas-liquid interface 80 where the pressure of the anti-icification material is substantially equal to the pressure of the bath material 28 near or adjacent the opening 24a of the anti-icification chamber 24. This insures that the bath material 28 is not able to touch or engage the injection nozzle 16, specifically during the injection of the coolant material through the injection nozzle 16. This substantially eliminates the possibility of icing on the injection nozzle 16. When the injection nozzle 16 is not subject to icing, its use can be substantially continuous. Therefore, there is no need to allow the injection nozzle 16 to warm to remove the ice or provide a separate mechanism to de-ice the injection nozzle 16. By providing the anti-icification material to the anti-icification chamber 24, the injection nozzle 16 can be kept clear of ice, which may otherwise form if the cooling material is injected through the injection nozzle 16 directly into the bath material 28. It will be understood that the term "icing" as used herein may refer to the formation of any crystal. Furthermore, "anti-icing" or "de-icing" refers to the elimination or inhibition of any such crystals.

The anti-icification chamber 24 can be formed of any suitable material. However, in a cryogenic system, such as that illustrated herein, the anti-icification chamber 24 is generally formed of a rigid material, such as stainless steel. Nevertheless, it will be understood that, especially in non-cryogenic systems, other materials may be used, such as polymers, to form the anti-icification chamber 24.

Because the coolant material can be provided substantially continuously through the injection nozzle 16, the temperature of the bath material 28 can be substantially and continuously controlled or maintained. Supplying the coolant material in a substantially continuous manner by appropriate control of the valve 36 also better enables the injection nozzle 16 to be kept substantially clear of ice or frozen material, thus in turn helping the bath material 28 to be more easily maintained at a desired temperature.

Once the bath material 28 has been cooled to the appropriate temperature, the propellant from the propellant supply 60 can be supplied to the heat exchanger 66 to densify the propellant. The densified propellant can then be provided to the densified propellant storage tank 68. An exemplary propellant that can be densified is liquid oxygen. The liquid oxygen can be substantially densified to increase the efficiency of a launch vehicle system. The propellant is cooled and densifies as it travels through the heat exchanger 66 in the bath material 28. The bath material 28 can be maintained at the selected temperature by the provision of the coolant material from the coolant supply 34 through the injection nozzle 16. In addition, the coolant material can be supplied substantially continuously because of the anti-icing chamber 24. Therefore, the propellant from the propellant reservoir 60 can be substantially continuously densified because the bath material 28 can be maintained at the appropriate temperature. Generally, the coolant material evaporates into the free space 50 to remove thermal energy from the heat exchanger 66. This cools and densifies the propellant.

The anti-icing chamber 24 allows the densification system 10 to be operated substantially continuously; there is no need for the system 10 to be cycled on and off to allow any ice or material around the injection nozzle 16 to melt. In addition, the anti-icing chamber 24 allows the injection nozzle 16 to remain substantially clear of ice so that no additional mechanisms are necessary to de-ice the injection nozzle 16. Therefore, an efficient supply of densified propellants can be provided to the densified propellant storage tank 68.

Although the densification system 10 described above provides for a land-based system of densifying propellant, it will be understood that the densification system 10 can be properly augmented to place it upon a launch vehicle. Moreover, the densified propellant need not be stored in a densified propellant storage tank 68, but may also be supplied directly to a launch vehicle. Therefore, it will be understood that the present invention can be so augmented by those generally skilled in the art without escaping the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cooling system to cool a first fluid with a second fluid, comprising:

a vessel containing a selected volume of said first fluid;

a cooling injection nozzle disposed in said vessel adapted to inject said second fluid into said first fluid;

a coolant container containing a volume of said second fluid;

a supply line interconnecting said coolant container and said cooling injection nozzle;

a chamber disposed in said vessel and surrounding at least a portion of said injection nozzle and defining an opening, said chamber substantially shielding said injection nozzle from contact with said first fluid;

a purge fluid inlet extending from said chamber;

a purge fluid supply, wherein a volume of said purge fluid is supplied from said purge fluid supply to said chamber;

wherein an interface is formed between said first fluid and said purge fluid when said purge fluid is supplied to said chamber; and wherein said chamber allows for a substantially maintainable and selectable temperature of said first fluid.

2. The cooling system of claim 1, further comprising:

said vessel defining an evaporation space;

a vent allowing a volume of second fluid to be vented from said evaporation space; and wherein said evaporation space allows said second fluid to evaporate from below a surface of said first fluid to cool said first fluid.

3. The cooling system of claim 2, further comprising:

a vent valve to selectively control a rate of fluid venting from said vessel; and wherein controlling said venting assists in controlling the temperature of said first fluid.

4. The cooling system of claim 1, further comprising:

an auxiliary purge fluid line to supply an auxiliary purge fluid volume through said injection nozzle when said second fluid is not being supplied through said injection nozzle; and wherein said auxiliary purge fluid volume maintains a positive pressure through said injection nozzle to substantially eliminate solids formation in or on said injection nozzle.

5. The cooling system of claim 1, wherein:

said chamber includes a substantially rigid housing encompassing at least 20% of a total available area around said injection nozzle, and defining an outlet opening;

when activated said chamber includes a pressure of said purge fluid greater than a pressure of said first fluid, such that said interface substantially defines a boundary between said first fluid and an interior of said chamber; and wherein said first fluid is maintained a distance from said injection nozzle when said chamber is substantially filled with said purge fluid.

6. The cooling system of claim 5, wherein:

said chamber and said interface define an anti-ice volume substantially surrounding said injection nozzle to substantially eliminate said first liquid from contacting said injection nozzle.

7. The cooling system of claim 1, further comprising:

a heat exchanger in thermal communication with said first fluid; and wherein passing a densifiable material through said heat exchanger densifies said densifiable material.

8. The cooling system of claim 1, wherein:

said first fluid includes nitrogen;

said second fluid includes hydrogen; and said purge fluid includes a substantially non-compressible gas.

9. An anti-crystallization apparatus to substantially eliminate the formation of crystals on or in an injection nozzle, the anti-crystallization apparatus comprising:

a chamber adapted to withstand a pressure, said chamber defining an anti-crystallization volume and having an outlet opening, said injection nozzle being disposed within said chamber;

said injection nozzle to inject a first fluid at a selected rate through said chamber and through said outlet opening;

an injection port to inject a second fluid into said chamber to maintain a pressure within said chamber greater than a pressure outside of said chamber; and wherein an interface is formed at said outlet opening between said second fluid and an exterior fluid present adjacent an exterior of said chamber such that said exterior fluid is substantially eliminated from said interior of said chamber.

10. The anti-crystallization apparatus of claim 9, further comprising:

a vessel containing said exterior fluid;

a first fluid container, wherein said first fluid is injected through said injection nozzle through said opening of said chamber and into said exterior fluid; and wherein said first fluid travels through said anti-crystallization volume to cool said exterior fluid.

11. The anti-crystallization apparatus of claim 10, further comprising:

a vent extending from said vessel;

wherein said vessel defines an evaporation volume substantially devoid of said exterior fluid to allow said first fluid to evaporate; and wherein said vent selectively allows a volume of said first or second fluid to exit said vessel.

12. The anti-crystallization apparatus of claim 10, further comprising:

a second fluid supply, wherein a volume of said second fluid is supplied from said second fluid supply to said chamber; and wherein said chamber allows for a substantially maintainable and selectable temperature of said exterior fluid.

13. The anti-crystallization apparatus of claim 10, further comprising:

a first container containing a volume of said first fluid;

a supply line interconnecting said first fluid container and said injection nozzle;

a valve to control the flow of said first fluid through said injection nozzle; and wherein selecting a flow rate with said valve allows a selection of a temperature of said exterior fluid.

14. The anti-crystallization apparatus of claim 10, further comprising:

a heat exchanger in thermal communication with said exterior fluid or said first fluid; and wherein passing a densifiable material through said heat exchanger densifies said densifiable material.

15. A method of injecting a first fluid, with an injection nozzle, into a second fluid through an anti-icing chamber, the method comprising:

filling a vessel with a selected volume of said second fluid;

forming a substantially constantly sized anti-icing chamber;

disposing said anti-icing chamber in said vessel substantially within said volume of said second fluid, wherein said chamber includes an outlet opening;

injecting said first fluid into said second fluid through said outlet opening; and injecting a third fluid into said chamber to prevent said first fluid from entering said chamber.

16. The method of claim 15, further comprising:

providing said first fluid having a boiling point less than the freezing point of said second fluid;

evaporating a volume of said first fluid from said second fluid to cool said second fluid; and venting a volume of said first fluid from said vessel.

17. The method of claim 15, further comprising:

disposing a heat exchanger in thermal communication with said second fluid; and flowing a fourth fluid through said heat exchanger to cool said fourth fluid.

18. The method of claim 17, further comprising:

removing a portion of thermal energy from said heat exchanger with said first fluid; and removing a portion of thermal energy from said fourth fluid.

19. The method of claim 15, wherein said first fluid includes hydrogen; and said second fluid includes nitrogen.

20. An injection nozzle system comprising:

a vessel for holding a quantity of a bath fluid;

a member disposed in said vessel so as to be immersed in said bath fluid;

an injection nozzle disposed in said member;

a coolant supply for supplying a coolant through said injection nozzle into said bath fluid; and an purge supply for supplying a purge fluid through said member, said purge fluid operating to keep said bath fluid from entering said member at least while said coolant is flowing through said injection nozzle.

21. The injection nozzle system of claim 20, further comprising:

a vent extending from said vessel;

wherein said vessel defines an evaporation volume substantially devoid of said bath fluid and to allow said coolant to evaporate; and wherein said vent selectively allows a volume of said purge fluid and said coolant to exit said vessel.

22. The injection nozzle system of claim 20, further comprising:

a propellant fluid, wherein a volume of said propellant fluid is supplied into said vessel; and wherein said chamber allows for a substantially maintainable and selectable temperature of said bath fluid.

23. The injection nozzle system of claim 22, further comprising:

a heat exchanger in thermal communication with said bath fluid or said coolant; and wherein passing said propellant through said heat exchanger densities said propellant.

* * * * *